US012772980B2

(12) United States Patent
Kitt et al.

(10) Patent No.: US 12,772,980 B2
(45) Date of Patent: Oct. 27, 2026

(54) HERBICIDAL COMPOSITIONS

(71) Applicant: SYNGENTA CROP PROTECTION AG, Basel (CH)

(72) Inventors: Mark John Kitt, Greensboro, NC (US); Philip Matthew Joyce, Bracknell (GB); Walter Thomas, Greensboro, NC (US)

(73) Assignee: SYNGENTA CROP PROTECTION AG, Basel (CH)

( * ) Notice: Subject to any disclaimer, the term of this patent is extended or adjusted under 35 U.S.C. 154(b) by 0 days.

(21) Appl. No.: 19/232,481

(22) Filed: Jun. 9, 2025

(65) Prior Publication Data

US 2025/0302042 A1 Oct. 2, 2025

Related U.S. Application Data

(63) Continuation of application No. PCT/US2024/044608, filed on Aug. 30, 2024.

(60) Provisional application No. 63/536,128, filed on Sep. 1, 2023.

(51) Int. Cl.

| | |
|---|---|
| ***A01N 43/54*** | (2006.01) |
| ***A01N 37/22*** | (2006.01) |
| ***A01N 37/26*** | (2006.01) |
| ***A01N 41/10*** | (2006.01) |
| ***A01N 43/40*** | (2006.01) |
| ***A01N 43/80*** | (2006.01) |
| ***A01P 13/00*** | (2006.01) |

(52) U.S. Cl.

CPC ............. *A01N 43/54* (2013.01); *A01N 37/22* (2013.01); *A01N 37/26* (2013.01); *A01N 41/10* (2013.01); *A01N 43/40* (2013.01); *A01N 43/80* (2013.01); *A01P 13/00* (2021.08)

(58) Field of Classification Search

CPC ........ A01N 43/54; A01N 37/26; A01N 41/10; A01N 43/40; A01N 43/80; A01N 37/22; A01P 13/00

See application file for complete search history.

(56) References Cited

U.S. PATENT DOCUMENTS

| | | | | |
|---|---|---|---|---|
| 10,654,840 | B2 * | 5/2020 | Deprez | A01N 43/88 |
| 11,026,423 | B2 | 6/2021 | Koschnick | |
| 2017/0027174 | A1 | 2/2017 | Poree | |
| 2021/0289786 | A1 | 9/2021 | Zagar | |
| 2021/0301355 | A1 | 9/2021 | Brusa | |
| 2023/0255206 | A1 | 8/2023 | Jin | |

FOREIGN PATENT DOCUMENTS

| | | | | |
|---|---|---|---|---|
| WO | WO-2008011509 | A2 * | 1/2008 | A01N 41/10 |
| WO | 2023280697 | A1 | 1/2023 | |

OTHER PUBLICATIONS

Sarangi, D., Biologically effective rates of a new premix (atrazine, bicyclopyrone, mesotrione, and S-metolachlor) for preemergence or postemergence control of common waterhemp [A tuberculatus (Moq.) Sauer var. rudis] in corn, 2017, Canadian Journal of Plant Science, vol. 97, I- 6, pp. 1075-1089. (Year: 2017).*

WIPO; App. No. PCT/US2024/044608; International Search Report and Written Opinion mailed Nov. 25, 2024; pp. 1-12.

* cited by examiner

*Primary Examiner* — Ali Soroush
*Assistant Examiner* — Andriae M Holt
(74) *Attorney, Agent, or Firm* — BakerHostetler; Toni-Junell Herbert

(57) ABSTRACT

The present disclosure relates to herbicidal combinations and their use in controlling plants or inhibiting plant growth. In particular, herbicidal combinations comprising A) rimisoxafen; (B) the group 15 herbicide; and (C) the HPPD inhibitor herbicide, or agrochemically acceptable salts thereof.

27 Claims, 10 Drawing Sheets

| Trt No. | Treatment | Rate g ai/ha | Control | | | | | | | | |
|---|---|---|---|---|---|---|---|---|---|---|---|
| | | | Pop. 1 | Pop. 2 | Pop. 3 | Pop. 4 | Pop. 5 | Pop. 6 | Pop. 7 | Pop. 8 | Pop. 9 |
| 1 | rimisoxafen | 2 | 50 | 7 | 7 | 7 | 38 | 13 | 33 | 37 | 32 |
| 2 | | 4 | 38 | 10 | 3 | 3 | 23 | 18 | 5 | 5 | 28 |
| 3 | mesotrione | 12.6 | 8 | 7 | 23 | 10 | 12 | 8 | 22 | 18 | 23 |
| 4 | | 25.3 | 40 | 17 | 13 | 30 | 37 | 35 | 23 | 35 | 28 |
| 5 | mesotrione + bicycloprone | 12.6 + 3.2 | 23 | 25 | 37 | 23 | 20 | 30 | 27 | 28 | 23 |
| 6 | | 25.3 + 6.3 | 73 | 68 | 33 | 13 | 92 | 33 | 58 | 32 | 17 |
| 7 | isoxaflutole | 6.25 | 0 | 37 | 17 | 3 | 13 | 10 | 8 | 12 | 8 |
| 8 | | 12.5 | 52 | 23 | 32 | 13 | 70 | 40 | 48 | 33 | 30 |
| 9 | rimisoxafen + mesotrione | 2 + 12.6 | 43 | 22 | 50 | 23 | 30 | 32 | 33 | 33 | 23 |
| 10 | | 4 + 12.6 | 53 | 33 | 33 | 13 | 72 | 43 | 57 | 33 | 32 |
| 11 | | 2 + 25.3 | 65 | 67 | 55 | 15 | 60 | 37 | 32 | 32 | 23 |
| 12 | | 4 + 25.3 | 37 | 32 | 23 | 7 | 40 | 35 | 57 | 33 | 20 |
| 13 | rimisoxafen + mesotrione + bicycloprone | 2 + 12.6 + 3.2 | 28 | 33 | 27 | 27 | 37 | 38 | 37 | 15 | 17 |
| 14 | | 4 + 12.6 + 3.2 | 70 | 47 | 45 | 13 | 50 | 20 | 25 | 25 | 13 |
| 15 | | 2 + 25.3 + 6.3 | 58 | 72 | 20 | 10 | 88 | 33 | 15 | 20 | 47 |
| 16 | | 4 + 25.3 + 6.3 | 62 | 60 | 23 | 17 | 80 | 30 | 25 | 47 | 45 |

FIG. 1A

| Trt No. | Treatment | Rate g ai/ha | Control | | | | | | | | |
|---|---|---|---|---|---|---|---|---|---|---|---|
| | | | Pop. 1 | Pop. 2 | Pop. 3 | Pop. 4 | Pop. 5 | Pop. 6 | Pop. 7 | Pop. 8 | Pop. 9 |
| 17 | rimisoxafen + isoxaflutole | 2 + 6.25 | 32 | 28 | 49 | 5 | 53 | 22 | 51 | 25 | 45 |
| 18 | | 2 + 12.5 | 62 | 35 | 53 | 27 | 52 | 55 | 48 | 55 | 42 |
| 19 | | 4 + 6.25 | 27 | 10 | 20 | 30 | 47 | 30 | 43 | 48 | 37 |
| 20 | | 4 + 12.5 | 58 | 25 | 33 | 18 | 77 | 30 | 40 | 52 | 53 |
| 21 | s-metalochlor | 30 | 22 | 12 | 38 | 13 | 23 | 17 | 30 | 30 | 40 |
| 22 | | 200 | 100 | 98 | 53 | 28 | 77 | 27 | 40 | 38 | 48 |
| 23 | rimisoxafen + s-metalochlor | 2 + 30 | 43 | 27 | 33 | 25 | 50 | 17 | 23 | 13 | 13 |
| 24 | | 4 + 30 | 85 | 23 | 12 | 23 | 40 | 33 | 15 | 35 | 17 |
| 25 | | 2 + 200 | 100 | 100 | 17 | 59 | 73 | 23 | 35 | 57 | 30 |
| 26 | | 4 + 200 | 100 | 100 | 37 | 47 | 98 | 33 | 60 | 57 | 47 |
| 27 | rimisoxafen + s-metalochlor + mesotrione | 2 + 30 + 12.6 | 30 | 47 | 30 | 10 | 25 | 35 | 42 | 38 | 40 |
| 28 | rimisoxafen + s-metalochlor + bicycloprone | 2+ 30 + 3.2 | 27 | 17 | 43 | 32 | 30 | 30 | 37 | 58 | 48 |
| 29 | bicyclopyrone | 3.2 | 20 | 5 | 13 | 22 | 12 | 0 | 8 | 13 | 35 |

FIG. 1B

| Trt No. | Treatment | Rate g ai/ha | Control (13DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 1 | Pyroxasulfone | 3 | 7 | 2 | 28 | 0 | 0 | 0 | 0 | 7 |
| 2 | Rimisoxafen | 1 | 0 | 0 | 27 | 3 | 0 | 0 | 0 | 7 |
| 3 | | 2 | 0 | 0 | 43 | 10 | 7 | 7 | 3 | 10 |
| 4 | | 4 | 0 | 0 | 47 | 82 | 13 | 27 | 15 | 17 |
| 5 | | 8 | 2 | 2 | 42 | 92 | 37 | 28 | 35 | 13 |
| 6 | | 16 | 3 | 10 | 43 | 100 | 58 | 37 | 65 | 45 |
| 7 | | 32 | 35 | 37 | 45 | 100 | 68 | 80 | 80 | 88 |
| 8 | SMOC | 15 | 7 | 2 | 33 | 3 | 3 | 7 | 37 | 0 |
| 9 | | 30 | 3 | 0 | 37 | 42 | 3 | 18 | 17 | 3 |
| 10 | | 60 | 23 | 13 | 85 | 65 | 30 | 15 | 3 | 30 |
| 11 | mesotrione | 12.6 | 0 | 0 | 63 | 40 | 20 | 13 | 33 | 50 |
| 12 | | 25.3 | 7 | 0 | 30 | 100 | 45 | 25 | 45 | 47 |
| 13 | Mesotrione + Bicyclopyrone | 25.3 + 6.3 | 10 | 7 | 77 | 87 | 52 | 38 | 39 | 40 |

FIG. 2A

| Trt No. | Treatment | Rate g ai/ha | Control (13DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 14 | Rimisoxafen + S-Moc | 4 + 15 | 13 | 2 | 23 | 62 | 17 | 8 | 10 | 10 |
| 15 | | 8 + 15 | 3 | 10 | 33 | 78 | 33 | 35 | 25 | 38 |
| 16 | | 16 + 15 | 10 | 13 | 35 | 100 | 48 | 35 | 57 | 37 |
| 17 | | 32 + 15 | 32 | 35 | 75 | 100 | 78 | 83 | 85 | 92 |
| 18 | Rimisoxafen + S-Moc | 4 + 30 | 10 | 0 | 47 | 95 | 30 | 20 | 27 | 27 |
| 19 | | 16 + 30 | 23 | 20 | 67 | 100 | 60 | 57 | 72 | 95 |
| 20 | Rimisoxafen + S-Moc | 4 + 60 | 58 | 27 | 80 | 98 | 45 | 23 | 38 | 30 |
| 21 | | 8 + 60 | 23 | 10 | 90 | 77 | 36 | 27 | 47 | 60 |
| 22 | | 16 + 60 | 28 | 8 | 75 | 100 | 73 | 35 | 60 | 53 |
| 23 | Rimisoxafen + S-Moc | 1 + 30 | 12 | 7 | 60 | 35 | 3 | 8 | 23 | 30 |
| 24 | | 2 + 30 | 10 | 3 | 78 | 53 | 15 | 8 | 75 | 25 |
| 25 | Rimisoxafen + S-Moc + Mesotrione | 4 + 15 + 12.6 | 10 | 10 | 68 | 77 | 47 | 32 | 53 | 57 |
| 26 | | 8 + 15 + 12.6 | 32 | 20 | 60 | 100 | 65 | 52 | 48 | 28 |
| 27 | | 16 + 15 + 12.6 | 23 | 17 | 52 | 100 | 72 | 65 | 77 | 57 |
| 28 | | 32 + 15 + 12.6 | 25 | 33 | 72 | 100 | 87 | 73 | 89 | 63 |

FIG. 2B

| Trt No. | Treatment | Rate g ai/ha | Control (13DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 29 | Rimisoxafen + S-Moc + Mesotrione | 4 + 30 + 12.6 | 20 | 0 | 72 | 100 | 28 | 42 | 45 | 35 |
| 30 | | 8 + 30 + 12.6 | 17 | 12 | 78 | 97 | 47 | 47 | 62 | 52 |
| 31 | | 16 + 30 + 12.6 | 28 | 12 | 78 | 88 | 57 | 47 | 55 | 68 |
| 32 | Rimisoxafen + S-Moc + Mesotrione | 4 + 60 + 12.6 | 40 | 25 | 87 | 88 | 65 | 23 | 77 | 20 |
| 33 | | 8 + 60 + 12.6 | 63 | 25 | 82 | 97 | 57 | 33 | 62 | 27 |
| 34 | | 16 + 60 + 12.6 | 28 | 43 | 90 | 100 | 90 | 48 | 70 | 40 |
| 35 | Rimisoxafen + S-Moc + Mesotrione | 4 + 15 + 25.3 | 12 | 7 | 77 | 100 | 25 | 50 | 50 | 28 |
| 36 | | 8 + 15 + 25.3 | 18 | 8 | 33 | 100 | 80 | 83 | 68 | 52 |
| 37 | | 16 + 15 + 25.3 | 27 | 17 | 63 | 95 | 78 | 57 | 77 | 77 |
| 38 | | 32 + 15 + 25.3 | 35 | 43 | 68 | 100 | 99 | 77 | 98 | 93 |
| 39 | Rimisoxafen + S-Moc + Mesotrione | 4 + 30 + 25.3 | 7 | 12 | 60 | 100 | 45 | 35 | 57 | 27 |
| 40 | | 4 + 60 + 25.3 | 62 | 33 | 83 | 100 | 70 | 57 | 62 | 68 |
| 41 | | 8 + 60 + 25.3 | 32 | 20 | 78 | 100 | 80 | 65 | 58 | 45 |
| 42 | | 16 + 60 + 25.3 | 47 | 25 | 89 | 100 | 82 | 65 | 93 | 63 |

FIG. 2C

| Trt No. | Treatment | Rate g ai/ha | Control (13DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 43 | Rimisoxafen + S-Moc + Mesotrione + Bicyclopyrone | 4 + 15 + 25.3 + 6.3 | 12 | 0 | 64 | 100 | 35 | 27 | 37 | 28 |
| 44 | | 8 + 15 + 25.3 + 6.3 | 15 | 5 | 67 | 100 | 90 | 63 | 58 | 23 |
| 45 | | 16 + 15 + 25.3 + 6.3 | 37 | 27 | 76 | 100 | 67 | 85 | 83 | 67 |
| 46 | | 32 + 15 + 25.3 + 6.3 | 53 | 62 | 83 | 100 | 99 | 87 | 94 | 85 |
| 47 | Rimisoxafen + S-Moc + Mesotrione + Bicyclopyrone | 4 + 30 + 25.3 + 6.3 | 10 | 8 | 85 | 100 | 42 | 45 | 47 | 17 |
| 48 | | 4 + 60 + 25.3 + 6.3 | 25 | 17 | 73 | 100 | 70 | 40 | 83 | 32 |
| 49 | | 8 + 60 + 25.3 + 6.3 | 40 | 23 | 92 | 100 | 68 | 65 | 68 | 47 |
| 50 | | 16 + 60 + 25.3 + 6.3 | 55 | 47 | 93 | 100 | 88 | 55 | 81 | 62 |
| 51 | Rimisoxafen + S-Moc + Mesotrione + Bicyclopyrone | 2 + 30 + 12.6 + 0 | 0 | 0 | 50 | 100 | 23 | 28 | 25 | 3 |
| 52 | | 2 + 30 + 25.3 + 0 | 20 | 3 | 40 | 100 | 70 | 47 | 47 | 17 |
| 53 | | 2 + 30 + 25.3 + 6.3 | 17 | 12 | 77 | 99 | 67 | 53 | 43 | 43 |
| 54 | Rimisoxafen + S-Moc + Mesotrione + Bicyclopyrone | 1 + 30 + 12.6 + 0 | 10 | 3 | 53 | 93 | 53 | 7 | 20 | 17 |
| 55 | | 1 + 30 + 25.3 + 0 | 8 | 0 | 70 | 95 | 27 | 33 | 27 | 20 |
| 56 | | 1 + 30 + 25.3 + 6.3 | 18 | 3 | 48 | 100 | 43 | 37 | 30 | 33 |
| 57 | Rimisoxafen + Pyroxasulfone + Mesotrione + Bicyclopyrone | 2 + 3 + 12.6 + 0 | 13 | 3 | 38 | 72 | 33 | 22 | 52 | 42 |
| 58 | | 2 + 3 + 25.3 + 0 | 15 | 0 | 43 | 100 | 48 | 72 | 57 | 87 |
| 59 | | 2 + 3 + 25.3 + 6.3 | 12 | 0 | 86 | 88 | 57 | 47 | 43 | 10 |

FIG. 2D

| Trt No. | Treatment | Rate g ai/ha | Control (21DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 1 | Pyroxasulfone | 3 | 0 | 0 | 7 | 30 | 0 | 33 | 53 | 5 |
| 2 | Rimisoxafen | 1 | 0 | 0 | 0 | 0 | 0 | 0 | 0 | 0 |
| 3 | | 2 | 0 | 0 | 0 | 45 | 0 | 0 | 0 | 0 |
| 4 | | 4 | 0 | 0 | 28 | 90 | 38 | 52 | 35 | 15 |
| 5 | | 8 | 0 | 0 | 23 | 98 | 37 | 40 | 45 | 13 |
| 6 | | 16 | 0 | 3 | 27 | 100 | 72 | 63 | 67 | 58 |
| 7 | | 32 | 23 | 30 | 17 | 100 | 75 | 88 | 92 | 92 |
| 8 | S-Moc | 15 | 0 | 0 | 17 | 22 | 13 | 33 | 20 | 20 |
| 9 | | 30 | 3 | 0 | 45 | 38 | 12 | 35 | 17 | 20 |
| 10 | | 60 | 28 | 0 | 67 | 58 | 44 | 42 | 32 | 27 |
| 11 | mesotrione | 12.6 | 0 | 0 | 52 | 55 | 42 | 40 | 20 | 30 |
| 12 | | 25.3 | 7 | 0 | 33 | 100 | 65 | 53 | 30 | 0 |
| 13 | Mesotrione + Bicyclopyrone | 25.3 + 6.3 | 13 | 0 | 72 | 95 | 62 | 78 | 67 | 55 |

FIG. 3A

| Trt No. | Treatment | Rate g ai/ha | Control (21DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 14 | Rimisoxafen + S-Moc | 4 + 15 | 0 | 0 | 20 | 75 | 35 | 43 | 30 | 37 |
| 15 | | 8 + 15 | 0 | 0 | 3 | 93 | 55 | 57 | 77 | 53 |
| 16 | | 16 + 15 | 3 | 2 | 7 | 100 | 63 | 52 | 77 | 50 |
| 17 | | 32 + 15 | 7 | 10 | 35 | 100 | 80 | 87 | 92 | 93 |
| 18 | Rimisoxafen + S-Moc | 4 + 30 | 3 | 0 | 23 | 94 | 63 | 32 | 35 | 28 |
| 19 | | 16 + 30 | 42 | 28 | 39 | 100 | 70 | 70 | 84 | 76 |
| 20 | Rimisoxafen + S-Moc | 4 + 60 | 43 | 7 | 77 | 100 | 74 | 57 | 53 | 60 |
| 21 | | 8 + 60 | 22 | 15 | 73 | 100 | 60 | 45 | 77 | 45 |
| 22 | | 16 + 60 | 17 | 1 | 38 | 100 | 78 | 57 | 74 | 58 |
| 23 | Rimisoxafen + S-Moc | 1 + 30 | 7 | 0 | 42 | 45 | 35 | 32 | 55 | 17 |
| 24 | | 2 + 30 | 15 | 0 | 70 | 68 | 30 | 15 | 55 | 20 |
| 25 | Rimisoxafen + S-Moc + Mesotrione | 4 + 15 + 12.6 | 0 | 0 | 15 | 97 | 63 | 67 | 70 | 64 |
| 26 | | 8 + 15 + 12.6 | 8 | 3 | 37 | 100 | 78 | 73 | 72 | 65 |
| 27 | | 16 + 15 + 12.6 | 18 | 5 | 23 | 100 | 83 | 83 | 90 | 63 |
| 28 | | 32 + 15 + 12.6 | 10 | 25 | 60 | 100 | 91 | 89 | 95 | 83 |

FIG. 3B

| Trt No. | Treatment | Rate g ai/ha | Control (21DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 29 | Rimisoxafen + S-Moc + Mesotrione | 4 + 30 + 12.6 | 0 | 0 | 38 | 100 | 57 | 72 | 73 | 53 |
| 30 | | 8 + 30 + 12.6 | 0 | 0 | 55 | 98 | 77 | 58 | 77 | 58 |
| 31 | | 16 + 30 + 12.6 | 23 | 3 | 73 | 100 | 77 | 77 | 80 | 83 |
| 32 | Rimisoxafen + S-Moc + Mesotrione | 4 + 60 + 12.6 | 50 | 25 | 85 | 100 | 74 | 63 | 83 | 37 |
| 33 | | 8 + 60 + 12.6 | 73 | 27 | 89 | 100 | 77 | 73 | 85 | 58 |
| 34 | | 16 + 60 + 12.6 | 52 | 48 | 92 | 100 | 92 | 74 | 81 | 47 |
| 35 | Rimisoxafen + S-Moc + Mesotrione | 4 + 15 + 25.3 | 3 | 0 | 57 | 100 | 70 | 78 | 73 | 52 |
| 36 | | 8 + 15 + 25.3 | 0 | 0 | 47 | 100 | 92 | 88 | 87 | 73 |
| 37 | | 16 + 15 + 25.3 | 22 | 8 | 37 | 100 | 89 | 75 | 87 | 80 |
| 38 | | 32 + 15 + 25.3 | 23 | 25 | 55 | 100 | 100 | 88 | 95 | 97 |
| 39 | Rimisoxafen + S-Moc + Mesotrione | 4 + 30 + 25.3 | 20 | 0 | 40 | 100 | 74 | 57 | 78 | 30 |
| 40 | | 4 + 60 + 25.3 | 76 | 50 | 77 | 100 | 81 | 81 | 80 | 68 |
| 41 | | 8 + 60 + 25.3 | 50 | 20 | 60 | 100 | 92 | 83 | 80 | 75 |
| 42 | | 16 + 60 + 25.3 | 66 | 28 | 90 | 100 | 95 | 76 | 93 | 77 |

FIG. 3C

| Trt No. | Treatment | Rate g ai/ha | Control (21DAA) | | | | | | | |
|---|---|---|---|---|---|---|---|---|---|---|
| | | | Pop. A | Pop. B | Pop. C | Pop. D | Pop. E | Pop. F | Pop. G | Pop. H |
| 43 | Rimisoxafen + S-Moc + Mesotrione + Bicyclopyrone | 4 + 15 + 25.3 + 6.3 | 3 | 0 | 73 | 100 | 67 | 57 | 63 | 45 |
| 44 | | 8 + 15 + 25.3 + 6.3 | 7 | 3 | 85 | 100 | 95 | 85 | 88 | 62 |
| 45 | | 16 + 15 + 25.3 + 6.3 | 40 | 18 | 83 | 100 | 78 | 89 | 92 | 87 |
| 46 | | 32 + 15 + 25.3 + 6.3 | 45 | 48 | 91 | 100 | 100 | 91 | 100 | 87 |
| 47 | Rimisoxafen + S-Moc + Mesotrione + Bicyclopyrone | 4 + 30 + 25.3 + 6.3 | 13 | 0 | 88 | 100 | 63 | 75 | 60 | 43 |
| 48 | | 4 + 60 + 25.3 + 6.3 | 28 | 10 | 80 | 100 | 84 | 68 | 73 | 37 |
| 49 | | 8 + 60 + 25.3 + 6.3 | 60 | 22 | 90 | 100 | 86 | 80 | 85 | 68 |
| 50 | | 16 + 60 + 25.3 + 6.3 | 58 | 52 | 98 | 100 | 93 | 86 | 88 | 73 |
| 51 | Rimisoxafen + S-Moc + Mesotrione + Bicyclopyrone | 2 + 30 + 12.6 + 0 | 0 | 0 | 28 | 100 | 48 | 67 | 58 | 32 |
| 52 | | 2 + 30 + 25.3 + 0 | 3 | 0 | 35 | 100 | 70 | 55 | 71 | 28 |
| 53 | | 2 + 30 + 25.3 + 6.3 | 3 | 3 | 76 | 100 | 88 | 63 | 58 | 48 |
| 54 | Rimisoxafen + S-Moc + Mesotrione + Bicyclopyrone | 1 + 30 + 12.6 + 0 | 2 | 0 | 35 | 93 | 73 | 58 | 45 | 38 |
| 55 | | 1 + 30 + 25.3 + 0 | 0 | 0 | 63 | 99 | 73 | 68 | 63 | 57 |
| 56 | | 1 + 30 + 25.3 + 6.3 | 0 | 0 | 35 | 100 | 70 | 53 | 68 | 73 |
| 57 | Rimisoxafen + Pyroxasulfone + Mesotrione + Bicyclopyrone | 2 + 3 + 12.6 + 0 | 5 | 0 | 40 | 85 | 65 | 68 | 75 | 73 |
| 58 | | 2 + 3 + 25.3 + 0 | 3 | 3 | 7 | 100 | 78 | 78 | 63 | 88 |
| 59 | | 2 + 3 + 25.3 + 6.3 | 20 | 3 | 86 | 92 | 83 | 78 | 77 | 42 |

FIG. 3D

HERBICIDAL COMPOSITIONS

CROSS-REFERENCE TO RELATED APPLICATIONS

This application is a continuation of International App. No. PCT/US2024/044608, filed Aug. 30, 2024, which claims the benefit of U.S. Provisional App. No. 63/536,128, filed Sep. 1, 2023, the entire contents of which are incorporated by reference herein.

The present invention relates herbicidal combinations and their use in controlling plants or inhibiting plant growth. In particular, herbicidal combinations of the invention comprise rimisoxafen, in combination with at least one further herbicide that is a group 15 herbicide and an HPPD inhibitor.

The object of the present invention is to provide herbicidal mixtures which are highly effective against various weed species (particularly at low dose), and is based on the finding that a rimisoxafen, in combination with herbicides having the modes of action as specified herein are particularly efficacious at mediating such weed control.

Thus in a first aspect of the invention, there is provided a composition comprising as component (A) rimisoxafen and as component (B), a group 15 herbicide, and as component (C) an HPPD inhibitor herbicide, or agrochemically acceptable salts thereof.

In a second aspect, the invention provides the use of a composition of the invention as a herbicide.

In a third aspect, the invention provides methods of (i) inhibiting plant growth, and (ii) controlling plants, said methods comprising applying to the plants or to the locus thereof: (A) rimisoxafen and as component (B), a group 15 herbicide, and as component (C) an HPPD inhibitor herbicide, or agrochemically acceptable salts thereof.

In a fourth aspect, the invention provides a method of controlling grasses and/or weeds in crops of useful plants which comprises applying to the useful plants or locus thereof or to the area of cultivation a herbicidally effective amount of (A) rimisoxafen and as component (B), a group 15 herbicide, and as component (C) an HPPD inhibitor herbicide, or agrochemically acceptable salts thereof.

FIG. 1A and FIG. 1B show a table summarizing experimental results.

FIGS. 2A, 2B, 2C, and 2D show a table summarizing experimental results.

FIGS. 3A, 3B, 3C, and 3D show a table summarizing experimental results.

When active ingredients are combined, the activity to be expected (E) for any given active ingredient combination obeys the so-called Colby Formula and can be calculated as follows (Colby, S. R., Calculating synergistic and antagonistic responses of herbicide combination. Weeds, Vol. 15, pages 20-22; 1967):

ppm=milligrams of active ingredient (a.i.) per liter

X=% action by first active ingredient using p ppm of the active ingredient

Y=% action by second active ingredient using q ppm of the active ingredient.

According to Colby, the expected action of active ingredients A+B using p+q ppm of active ingredient is represented by the following formula:

$$E = X + Y - \frac{X \cdot Y}{100}$$

If the action actually observed (O) is greater than the expected action E then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

Group 15 herbicides and HPPD-inhibitors, are effective herbicidal compounds. Accordingly, the combination of the present invention takes advantage of any additive herbicidal activity, and certain embodiments may even exhibit a synergistic effect. This occurs whenever the action of an active ingredient combination is greater than the sum of the actions of the individual components.

Combinations of the invention may also provide for an extended spectrum of activity in comparison to that obtained by each individual component, and/or permit the use of lower rates of the individual components when used in combination to that when used alone, in order to mediate effective herbicidal activity.

In addition, it is also possible that the composition of the invention may show increased crop tolerance, when compared with the effect of the component (A) alone. This occurs when the action of an active ingredient combination is less damaging to a useful crop than the action of one of the active ingredients alone. As stated above, compositions of the invention comprise as component (A) rimisoxafen, or an agrochemically acceptable salt thereof.

Group 15 herbicides are classified by the Weed Science Society of America (WSSA). Group 15 herbicides inhibit very long chain fatty acid (VLCFA) synthesis (Husted et al. 1966; Böger et al. 2000). These compounds typically affect susceptible weeds before emergence, but do not inhibit seed germination. Group 15 herbicides can be further classified into the following chemical classes: azolyl-carboxamides, thioacetamides, isoxazolmes, oxiranes, chloroacetamides, oxyacetamides, thiocarbamates, and benzofurans.

Group 15 herbicides include: cafenstrole, fentrazamide, ipfencarbazone, benfuresate, ethofumesate, fenoxasulfone, pyroxasulfone, indanofan, tridiphane, butylate, cycloate, dimepiperate, EPTC, esprocarb, molinate, orbencarb, pebulate, prosulfocarb, thiobencarb, tiocarbazil, tri-allate, cemolate, acetochlor, alachlor, allidochlor, butachlor, butenachlor, delachlor, diethatyl-ethyl, dimethachlor, dimethenamid, metazachlor, metolachlor (or S-Metolachlor), pethoxamid, pretilachlor, propachlor, propisochlor, prynachlor, thenylchlor, tlufenacet, mefenacet, and anilofos.

Group 27 herbicides are classified by the Weed Science Society of America (WSSA). Group 27 herbicides are bleaching herbicides, but inhibit 4-hydroxyphenyl-pyruvate-dioxygenase (4-HPPD), also sometimes referred to as HPPD inhibitors. Currently Group 27 herbicides can be classified as triketones, isoxazoles, and pyrazole.

Group 27 herbicides include: mesotrione, sulcotrione, tembotrione, tefuryltrione, bicyclopyrone, fenquinotrione, benzobicyclon, benzofenap, pyrasulfotole, topramezone, pyrazolynate, pyrazoxyfen, tolpyralate, and isoxaflutole.

Further herbicides that act as inhibitors of HPPD, include 3-[2-(3,4-dimethoxyphenyl)-6-methyl-3-oxo-pyridazine-4-carbonyl]bicyclo[3.2.1]octane-2,4-dione, 2-[2-(3,4-dimethoxyphenyl)-6-methyl-3-oxo-pyridazine-4-carbonyl]-5-methyl-cyclohexane-1,3-dione, 2-[2-(3,4-dimethoxyphenyl)-6-methyl-3-oxo-pyridazine-4-carbonyl]cyclohexane-1,3-dione, 2-[2-(3,4-dimethoxyphenyl)-6-methyl-3-oxo-pyridazine-4-carbonyl]-5,5-dimethyl-cyclohexane-1,3-dione, 6-[2-(3,4-dimethoxyphenyl)-6-methyl-3-oxo-pyridazine-4-carbonyl]-2,2,4,4-tetramethyl-cyclohexane-1,3,5-trione, 2-[2-(3,4-dimethoxyphenyl)-6-methyl-3-oxo-pyridazine-4-carbonyl]-5-ethyl-cyclohexane-1,3-dione, 2-[2-(3,4-dimethoxyphenyl)-6-methyl-3-oxo-pyridazine-4-carbonyl]-4,4,6,6-tetramethyl-cyclohexane-1,3-dione, 2-[6-cyclopropyl-2-(3,4-dimethoxyphenyl)-3-oxo-pyridazine-4-carbonyl]-5-methyl-cyclohexane-1,3-dione, 3-[6-cyclopropyl-2-(3,4-dimethoxyphenyl)-3-oxo-pyridazine-4-carbonyl]bicyclo[3.2.1]octane-2,4-dione, 2-[6-cyclopropyl-2-(3,4-dimethoxyphenyl)-3-oxo-pyridazine-4-carbonyl]-5,5-dimethyl-cyclohexane-1,3-dione, 6-[6-cyclopropyl-2-(3,4-dimethoxyphenyl)-3-oxo-pyridazine-4-carbonyl]-2,2,4,4-tetramethyl-cyclohexane-1,3,5-trione, 2-[6-cyclopropyl-2-(3,4-dimethoxyphenyl)-3-oxo-pyridazine-4-carbonyl]cyclohexane-1,3-dione, 4-[2-(3,4-dimethoxyphenyl)-6-methyl-3-oxo-pyridazine-4-carbonyl]-2,2,6,6-tetramethyl-tetrahydropyran-3,5-dione. 4-[6-cyclopropyl-2-(3,4-dimethoxyphenyl)-3-oxo-pyridazine-4-carbonyl]-2,2,6,6-tetramethyl-tetrahydropyran-3,5-dione and a compound of Formula (II)

(II)

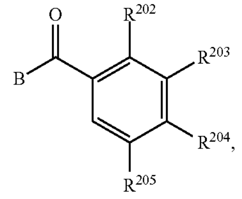

wherein B is selected from the group consisting of $B^1$ and $B^2$ $B^1$

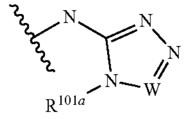

and $B^2$

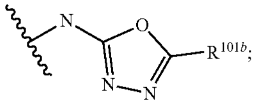

W is selected from the group consisting of —N— and —$CR^{206}$; $R^{201a}$ is $C_1$-$C_4$ alkyl-; $R^{201b}$ is selected from the group consisting of hydrogen and $C_1$-$C_4$ alkyl-; $R^{202}$ is selected from the group consisting of $C_1$-$C_6$ alkyl-, $C_1$-$C_6$ haloalkyl-, $C_1$-$C_6$alkyl-S(O)v- and halogen, wherein v is an integer selected from 0, 1 or 2; $R^{203}$ is selected from the group consisting of hydrogen, halogen, $C_1$-$C_6$alkyl, $C_1$-$C_6$haloalkyl. $C_1$-$C_6$alkyl-S$(O)_v$— and $C_1$-$C_6$haloalkyl-S(O)—, wherein v is an integer selected from 0, 1 or 2; $R^{204}$ is selected form the group consisting of halogen. $C_1$-$C_6$alkyl, $C_1$-$C_6$haloalkyl and $C_1$-$C_6$alkyl-S$(O)_v$—, wherein v is an integer selected from 0, 1 or 2; $R^{205}$ is selected from the group consisting of hydrogen, halogen, $C_1$-$C_6$ alkyl and $C_1$-$C_6$ haloalkyl; and $R^{206}$ is selected from the group consisting of hydrogen and $C_1$-$C_4$ alkyl-.

Preferred herbicides from component B for use in the invention are selected from the group consisting of B(i) bicyclopyrone, B(ii) sulcotrione B(iii) tembotrione. B(iv) mesotrione, B(v) topramezone, B(vi) a compound of Formula (II) as defined herein, and B(vii) 2-[2-(3,4-dimethoxyphenyl)-6-methyl-3-oxo-pyridazine-4-carbonyl]cyclohexane-1,3-di one.

Combinations of herbicides according to the disclosure include those defined in Tables A, B, and C below.

TABLE A

| Component A | Component B | Component C |
|---|---|---|
| rimisoxafen | Group 15 herbicide | mesotrione |
| rimisoxafen | Group 15 herbicide | sulcotrione |
| rimisoxafen | Group 15 herbicide | tembotrione |
| rimisoxafen | Group 15 herbicide | tefuryltrione |
| rimisoxafen | Group 15 herbicide | bicyclopyrone |
| rimisoxafen | Group 15 herbicide | fenquinotrione |
| rimisoxafen | Group 15 herbicide | benzobicyclon |
| rimisoxafen | Group 15 herbicide | benzofenap |
| rimisoxafen | Group 15 herbicide | pyrasulfotole |
| rimisoxafen | Group 15 herbicide | topramezone |
| rimisoxafen | Group 15 herbicide | pyrazolynate |
| rimisoxafen | Group 15 herbicide | pyrazoxyfen |
| rimisoxafen | Group 15 herbicide | tolpyralate |
| rimisoxafen | Group 15 herbicide | isoxaflutole |

TABLE B

| Component A | Component B | Component C |
|---|---|---|
| rimisoxafen | cafenstrole | HPPD herbicide |
| rimisoxafen | fentrazamide | HPPD herbicide |
| rimisoxafen | ipfencarbazone | HPPD herbicide |
| rimisoxafen | benfuresate | HPPD herbicide |
| rimisoxafen | ethofumesate | HPPD herbicide |
| rimisoxafen | fenoxasulfone | HPPD herbicide |
| rimisoxafen | pyroxasulfone | HPPD herbicide |
| rimisoxafen | indanofan | HPPD herbicide |
| rimisoxafen | tridiphane | HPPD herbicide |
| rimisoxafen | butylate | HPPD herbicide |
| rimisoxafen | cycloate | HPPD herbicide |
| rimisoxafen | dimepiperate | HPPD herbicide |
| rimisoxafen | EPTC | HPPD herbicide |
| rimisoxafen | esprocarb | HPPD herbicide |
| rimisoxafen | molinate | HPPD herbicide |
| rimisoxafen | orbencarb | HPPD herbicide |
| rimisoxafen | pebulate | HPPD herbicide |
| rimisoxafen | prosulfocarb | HPPD herbicide |
| rimisoxafen | thiobencarb | HPPD herbicide |
| rimisoxafen | tiocarbazil | HPPD herbicide |
| rimisoxafen | tri-allate | HPPD herbicide |
| rimisoxafen | cernolate | HPPD herbicide |
| rimisoxafen | acetochlor | HPPD herbicide |
| rimisoxafen | alachlor | HPPD herbicide |
| rimisoxafen | allidochlor | HPPD herbicide |
| rimisoxafen | butachlor | HPPD herbicide |
| rimisoxafen | butenachlor | HPPD herbicide |
| rimisoxafen | delachlor | HPPD herbicide |
| rimisoxafen | diethatyl-ethyl | HPPD herbicide |
| rimisoxafen | dimethachlor | HPPD herbicide |
| rimisoxafen | dimethenamid | HPPD herbicide |
| rimisoxafen | metazachlor | HPPD herbicide |
| rimisoxafen | metolachlor (or S-Moc) | HPPD herbicide |
| rimisoxafen | pethoxamid | HPPD herbicide |
| rimisoxafen | pretilachlor | HPPD herbicide |
| rimisoxafen | propachlor | HPPD herbicide |
| rimisoxafen | propisochlor | HPPD herbicide |
| rimisoxafen | prynachlor | HPPD herbicide |
| rimisoxafen | thenylchlor | HPPD herbicide |
| rimisoxafen | tlufenacet | HPPD herbicide |
| rimisoxafen | mefenacet | HPPD herbicide |
| rimisoxafen | anilofos | HPPD herbicide |

TABLE C

| Component A | Component B | Component C |
|---|---|---|
| rimisoxafen | cafenstrole | mesotrione |
| rimisoxafen | cafenstrole | sulcotrione |
| rimisoxafen | cafenstrole | tembotrione |
| rimisoxafen | cafenstrole | tefuryltrione |
| rimisoxafen | cafenstrole | bicyclopyrone |
| rimisoxafen | cafenstrole | fenquinotrione |
| rimisoxafen | cafenstrole | benzobicyclon |
| rimisoxafen | cafenstrole | benzofenap |
| rimisoxafen | cafenstrole | pyrasulfotole |
| rimisoxafen | cafenstrole | topramezone |
| rimisoxafen | cafenstrole | pyrazolynate |
| rimisoxafen | cafenstrole | pyrazoxyfen |
| rimisoxafen | cafenstrole | tolpyralate |
| rimisoxafen | cafenstrole | isoxaflutole |
| rimisoxafen | fentrazamide | mesotrione |
| rimisoxafen | fentrazamide | sulcotrione |
| rimisoxafen | fentrazamide | tembotrione |
| rimisoxafen | fentrazamide | tefuryltrione |
| rimisoxafen | fentrazamide | bicyclopyrone |
| rimisoxafen | fentrazamide | fenquinotrione |
| rimisoxafen | fentrazamide | benzobicyclon |
| rimisoxafen | fentrazamide | benzofenap |
| rimisoxafen | fentrazamide | pyrasulfotole |
| rimisoxafen | fentrazamide | topramezone |
| rimisoxafen | fentrazamide | pyrazolynate |
| rimisoxafen | fentrazamide | pyrazoxyfen |
| rimisoxafen | fentrazamide | tolpyralate |
| rimisoxafen | fentrazamide | isoxaflutole |
| rimisoxafen | ipfencarbazone | mesotrione |
| rimisoxafen | ipfencarbazone | sulcotrione |
| rimisoxafen | ipfencarbazone | tembotrione |
| rimisoxafen | ipfencarbazone | tefuryltrione |
| rimisoxafen | ipfencarbazone | bicyclopyrone |
| rimisoxafen | ipfencarbazone | fenquinotrione |
| rimisoxafen | ipfencarbazone | benzobicyclon |
| rimisoxafen | ipfencarbazone | benzofenap |
| rimisoxafen | ipfencarbazone | pyrasulfotole |
| rimisoxafen | ipfencarbazone | topramezone |
| rimisoxafen | ipfencarbazone | pyrazolynate |
| rimisoxafen | ipfencarbazone | pyrazoxyfen |
| rimisoxafen | ipfencarbazone | tolpyralate |
| rimisoxafen | ipfencarbazone | isoxaflutole |
| rimisoxafen | benfuresate | mesotrione |
| rimisoxafen | benfuresate | sulcotrione |
| rimisoxafen | benfuresate | tembotrione |
| rimisoxafen | benfuresate | tefuryltrione |
| rimisoxafen | benfuresate | bicyclopyrone |
| rimisoxafen | benfuresate | fenquinotrione |
| rimisoxafen | benfuresate | benzobicyclon |
| rimisoxafen | benfuresate | benzofenap |
| rimisoxafen | benfuresate | pyrasulfotole |
| rimisoxafen | benfuresate | topramezone |
| rimisoxafen | benfuresate | pyrazolynate |
| rimisoxafen | benfuresate | pyrazoxyfen |
| rimisoxafen | benfuresate | tolpyralate |
| rimisoxafen | benfuresate | isoxaflutole |
| rimisoxafen | ethofumesate | mesotrione |
| rimisoxafen | ethofumesate | sulcotrione |
| rimisoxafen | ethofumesate | tembotrione |
| rimisoxafen | ethofumesate | tefuryltrione |
| rimisoxafen | ethofumesate | bicyclopyrone |
| rimisoxafen | ethofumesate | fenquinotrione |
| rimisoxafen | ethofumesate | benzobicyclon |
| rimisoxafen | ethofumesate | benzofenap |
| rimisoxafen | ethofumesate | pyrasulfotole |
| rimisoxafen | ethofumesate | topramezone |
| rimisoxafen | ethofumesate | pyrazolynate |
| rimisoxafen | ethofumesate | pyrazoxyfen |
| rimisoxafen | ethofumesate | tolpyralate |
| rimisoxafen | ethofumesate | isoxaflutole |
| rimisoxafen | fenoxasulfone | mesotrione |
| rimisoxafen | fenoxasulfone | sulcotrione |
| rimisoxafen | fenoxasulfone | tembotrione |
| rimisoxafen | fenoxasulfone | tefuryltrione |
| rimisoxafen | fenoxasulfone | bicyclopyrone |
| rimisoxafen | fenoxasulfone | fenquinotrione |
| rimisoxafen | fenoxasulfone | benzobicyclon |
| rimisoxafen | fenoxasulfone | benzofenap |

TABLE C-continued

| Component A | Component B | Component C |
|---|---|---|
| rimisoxafen | fenoxasulfone | pyrasulfotole |
| rimisoxafen | fenoxasulfone | topramezone |
| rimisoxafen | fenoxasulfone | pyrazolynate |
| rimisoxafen | fenoxasulfone | pyrazoxyfen |
| rimisoxafen | fenoxasulfone | tolpyralate |
| rimisoxafen | fenoxasulfone | isoxaflutole |
| rimisoxafen | pyroxasulfone | mesotrione |
| rimisoxafen | pyroxasulfone | sulcotrione |
| rimisoxafen | pyroxasulfone | lembotrione |
| rimisoxafen | pyroxasulfone | tefuryltrione |
| rimisoxafen | pyroxasulfone | bicyclopyrone |
| rimisoxafen | pyroxasulfone | fenquinotrione |
| rimisoxafen | pyroxasulfone | benzobicyclon |
| rimisoxafen | pyroxasulfone | benzofenap |
| rimisoxafen | pyroxasulfone | pyrasulfotole |
| rimisoxafen | pyroxasulfone | topramezone |
| rimisoxafen | pyroxasulfone | pyrazolynate |
| rimisoxafen | pyroxasulfone | pyrazoxyfen |
| rimisoxafen | pyroxasulfone | tolpyralate |
| rimisoxafen | pyroxasulfone | isoxaflutole |
| rimisoxafen | indanofan | mesotrione |
| rimisoxafen | indanofan | sulcotrione |
| rimisoxafen | indanofan | tembotrione |
| rimisoxafen | indanofan | tefuryltrione |
| rimisoxafen | indanofan | bicyclopyrone |
| rimisoxafen | indanofan | fenquinotrione |
| rimisoxafen | indanofan | benzobicyclon |
| rimisoxafen | indanofan | benzofenap |
| rimisoxafen | indanofan | pyrasulfotole |
| rimisoxafen | indanofan | topramezone |
| rimisoxafen | indanofan | pyrazolynate |
| rimisoxafen | indanofan | pyrazoxyfen |
| rimisoxafen | indanofan | tolpyralate |
| rimisoxafen | indanofan | isoxaflutole |
| rimisoxafen | tridiphane | mesotrione |
| rimisoxafen | tridiphane | sulcotrione |
| rimisoxafen | tridiphane | tembotrione |
| rimisoxafen | tridiphane | tefuryltrione |
| rimisoxafen | tridiphane | bicyclopyrone |
| rimisoxafen | tridiphane | fenquinotrione |
| rimisoxafen | tridiphane | benzobicyclon |
| rimisoxafen | tridiphane | benzofenap |
| rimisoxafen | tridiphane | pyrasulfotole |
| rimisoxafen | tridiphane | topramezone |
| rimisoxafen | tridiphane | pyrazolynate |
| rimisoxafen | tridiphane | pyrazoxyfen |
| rimisoxafen | tridiphane | tolpyralate |
| rimisoxafen | tridiphane | isoxaflutole |
| rimisoxafen | butylate | mesotrione |
| rimisoxafen | butylate | sulcotrione |
| rimisoxafen | butylate | tembotrione |
| rimisoxafen | butylate | tefuryltrione |
| rimisoxafen | butylate | bicyclopyrone |
| rimisoxafen | butylate | fenquinotrione |
| rimisoxafen | butylate | benzobicyclon |
| rimisoxafen | butylate | benzofenap |
| rimisoxafen | butylate | pyrasulfotole |
| rimisoxafen | butylate | topramezone |
| rimisoxafen | butylate | pyrazolynate |
| rimisoxafen | butylate | pyrazoxyfen |
| rimisoxafen | butylate | tolpyralate |
| rimisoxafen | butylate | isoxaflutole |
| rimisoxafen | cycloate | mesotrione |
| rimisoxafen | cycloate | sulcotrione |
| rimisoxafen | cycloate | tembotrione |
| rimisoxafen | cycloate | tefuryltrione |
| rimisoxafen | cycloate | bicyclopyrone |
| rimisoxafen | cycloate | fenquinotrione |
| rimisoxafen | cycloate | benzobicyclon |
| rimisoxafen | cycloate | benzofenap |
| rimisoxafen | cycloate | pyrasulfotole |
| rimisoxafen | cycloate | topramezone |
| rimisoxafen | cycloate | pyrazolynate |
| rimisoxafen | cycloate | pyrazoxyfen |
| rimisoxafen | cycloate | tolpyralate |
| rimisoxafen | cycloate | isoxaflutole |
| rimisoxafen | dimepiperate | mesotrione |
| rimisoxafen | dimepiperate | sulcotrione |

TABLE C-continued

| Component A | Component B | Component C |
|---|---|---|
| rimisoxafen | dimepiperate | tembotrione |
| rimisoxafen | dimepiperate | tefuryltrione |
| rimisoxafen | dimepiperate | bicyclopyrone |
| rimisoxafen | dimepiperate | fenquinotrione |
| rimisoxafen | dimepiperate | benzobicyclon |
| rimisoxafen | dimepiperate | benzofenap |
| rimisoxafen | dimepiperate | pyrasulfotole |
| rimisoxafen | dimepiperate | topramezone |
| rimisoxafen | dimepiperate | pyrazolynate |
| rimisoxafen | dimepiperate | pyrazoxyfen |
| rimisoxafen | dimepiperate | tolpyralate |
| rimisoxafen | dimepiperate | isoxaflutole |
| rimisoxafen | EPTC | mesotrione |
| rimisoxafen | EPTC | sulcotrione |
| rimisoxafen | EPTC | tembotrione |
| rimisoxafen | EPTC | tefuryltrione |
| rimisoxafen | EPTC | bicyclopyrone |
| rimisoxafen | EPTC | fenquinotrione |
| rimisoxafen | EPTC | benzobicyclon |
| rimisoxafen | EPTC | benzofenap |
| rimisoxafen | EPTC | pyrasulfotole |
| rimisoxafen | EPTC | topramezone |
| rimisoxafen | EPTC | pyrazolynate |
| rimisoxafen | EPTC | pyrazoxyfen |
| rimisoxafen | EPTC | tolpyralate |
| rimisoxafen | EPTC | isoxaflutole |
| rimisoxafen | esprocarb | mesotrione |
| rimisoxafen | esprocarb | sulcotrione |
| rimisoxafen | esprocarb | tembotrione |
| rimisoxafen | esprocarb | tefuryltrione |
| rimisoxafen | esprocarb | bicyclopyrone |
| rimisoxafen | esprocarb | fenquinotrione |
| rimisoxafen | esprocarb | benzobicyclon |
| rimisoxafen | esprocarb | benzofenap |
| rimisoxafen | esprocarb | pyrasulfotole |
| rimisoxafen | esprocarb | topramezone |
| rimisoxafen | esprocarb | pyrazolynate |
| rimisoxafen | esprocarb | pyrazoxyfen |
| rimisoxafen | esprocarb | tolpyralate |
| rimisoxafen | esprocarb | isoxaflutole |
| rimisoxafen | molinate | mesotrione |
| rimisoxafen | molinate | sulcotrione |
| rimisoxafen | molinate | tembotrione |
| rimisoxafen | molinate | tefuryltrione |
| rimisoxafen | molinate | bicyclopyrone |
| rimisoxafen | molinate | fenquinotrione |
| rimisoxafen | molinate | benzobicyclon |
| rimisoxafen | molinate | benzofenap |
| rimisoxafen | molinate | pyrasulfotole |
| rimisoxafen | molinate | topramezone |
| rimi soxafen | molinate | pyrazolynate |
| rimisoxafen | molinate | pyrazoxyfen |
| rimisoxafen | molinate | tolpyralate |
| rimisoxafen | molinate | isoxaflutole |
| rimisoxafen | orbencarb | mesotrione |
| rimisoxafen | orbencarb | sulcotrione |
| rimisoxafen | orbencarb | tembotrione |
| rimisoxafen | orbencarb | tefuryltrione |
| rimisoxafen | orbencarb | bicyclopyrone |
| rimisoxafen | orbencarb | fenquinotrione |
| rimisoxafen | orbencarb | benzobicyclon |
| rimisoxafen | orbencarb | benzofenap |
| rimisoxafen | orbencarb | pyrasulfotole |
| rimisoxafen | orbencarb | topramezone |
| rimisoxafen | orbencarb | pyrazolynate |
| rimisoxafen | orbencarb | pyrazoxyfen |
| rimisoxafen | orbencarb | tolpyralate |
| rimisoxafen | orbencarb | isoxaflutole |
| rimisoxafen | pebulate | mesotrione |
| rimisoxafen | pebulate | sulcotrione |
| rimisoxafen | pebulate | tembotrione |
| rimisoxafen | pebulate | tefuryltrione |
| rimisoxafen | pebulate | bicyclopyrone |
| rimisoxafen | pebulate | fenquinotrione |
| rimisoxafen | pebulate | benzobicyclon |
| rimisoxafen | pebulate | benzofenap |
| rimisoxafen | pebulate | pyrasulfotole |
| rimisoxafen | pebulate | topramezone |
| rimisoxafen | pebulate | pyrazolynate |
| rimisoxafen | pebulate | pyrazoxyfen |
| rimisoxafen | pebulate | tolpyralate |
| rimisoxafen | pebulate | isoxaflutole |
| rimisoxafen | prosulfocarb | mesotrione |
| rimisoxafen | prosulfocarb | sulcotrione |
| rimisoxafen | prosulfocarb | tembotrione |
| rimisoxafen | prosulfocarb | tefuryltrione |
| rimisoxafen | prosulfocarb | bicyclopyrone |
| rimisoxafen | prosulfocarb | fenquinotrione |
| rimisoxafen | prosulfocarb | benzobicyclon |
| rimisoxafen | prosulfocarb | benzofenap |
| rimisoxafen | prosulfocarb | pyrasulfotole |
| rimisoxafen | prosulfocarb | topramezone |
| rimisoxafen | prosulfocarb | pyrazolynate |
| rimisoxafen | prosulfocarb | pyrazoxyfen |
| rimisoxafen | prosulfocarb | tolpyralate |
| rimisoxafen | prosulfocarb | isoxaflutole |
| rimisoxafen | thiobencarb | mesotrione |
| rimisoxafen | thiobencarb | sulcotrione |
| rimisoxafen | thiobencarb | tembotrione |
| rimisoxafen | thiobencarb | tefuryltrione |
| rimisoxafen | thiobencarb | bicyclopyrone |
| rimisoxafen | thiobencarb | fenquinotrione |
| rimisoxafen | thiobencarb | benzobicyclon |
| rimisoxafen | thiobencarb | benzofenap |
| rimisoxafen | thiobencarb | pyrasulfotole |
| rimisoxafen | thiobencarb | topramezone |
| rimisoxafen | thiobencarb | pyrazolynate |
| rimisoxafen | thiobencarb | pyrazoxyfen |
| rimisoxafen | thiobencarb | tolpyralate |
| rimisoxafen | thiobencarb | isoxaflutole |
| rimisoxafen | tiocarbazil | mesotrione |
| rimisoxafen | tiocarbazil | sulcotrione |
| rimisoxafen | tiocarbazil | tembotrione |
| rimisoxafen | tiocarbazil | tefuryltrione |
| rimisoxafen | tiocarbazil | bicyclopyrone |
| rimisoxafen | tiocarbazil | fenquinotrione |
| rimisoxafen | tiocarbazil | benzobicyclon |
| rimisoxafen | tiocarbazil | benzofenap |
| rimisoxafen | tiocarbazil | pyrasulfotole |
| rimisoxafen | tiocarbazil | topramezone |
| rimisoxafen | tiocarbazil | pyrazolynate |
| rimisoxafen | tiocarbazil | pyrazoxyfen |
| rimisoxafen | tiocarbazil | tolpyralate |
| rimisoxafen | tiocarbazil | isoxaflutole |
| rimisoxafen | tri-allate | mesotrione |
| rimisoxafen | tri-allate | sulcotrione |
| rimisoxafen | tri-allate | tembotrione |
| rimisoxafen | tri-allate | tefuryltrione |
| rimisoxafen | tri-allate | bicyclopyrone |
| rimisoxafen | tri-allate | fenquinotrione |
| rimisoxafen | tri-allate | benzobicyclon |
| rimisoxafen | tri-allate | benzofenap |
| rimisoxafen | tri-allate | pyrasulfotole |
| rimisoxafen | tri-allate | topramezone |
| rimisoxafen | tri-allate | pyrazolynate |
| rimisoxafen | tri-allate | pyrazoxyfen |
| rimisoxafen | tri-allate | tolpyralate |
| rimisoxafen | tri-allate | isoxaflutole |
| rimisoxafen | cernolate | mesotrione |
| rimisoxafen | cernolate | sulcotrione |
| rimisoxafen | cernolate | tembotrione |
| rimisoxafen | cernolate | tefuryltrione |
| rimisoxafen | cernolate | bicyclopyrone |
| rimisoxafen | cernolate | fenquinotrione |
| rimisoxafen | cernolate | benzobicyclon |
| rimisoxafen | cernolate | benzofenap |
| rimisoxafen | cernolate | pyrasulfotole |
| rimisoxafen | cernolate | topramezone |
| rimisoxafen | cernolate | pyrazolynate |
| rimisoxafen | cernolate | pyrazoxyfen |
| rimisoxafen | cernolate | tolpyralate |
| rimisoxafen | cernolate | isoxaflutole |
| rimisoxafen | acetochlor | mesotrione |
| rimisoxafen | acetochlor | sulcotrione |
| rimisoxafen | acetochlor | tembotrione |
| rimisoxafen | acetochlor | tefuryltrione |

TABLE C-continued

| Component A | Component B | Component C |
|---|---|---|
| rimisoxafen | acetochlor | bicyclopyrone |
| rimisoxafen | acetochlor | fenquinotrione |
| rimisoxafen | acetochlor | benzobicyclon |
| rimisoxafen | acetochlor | benzofenap |
| rimisoxafen | acetochlor | pyrasulfotole |
| rimisoxafen | acetochlor | topramezone |
| rimisoxafen | acetochlor | pyrazolynate |
| rimisoxafen | acetochlor | pyrazoxyfen |
| rimisoxafen | acetochlor | tolpyralate |
| rimisoxafen | acetochlor | isoxaflutole |
| rimisoxafen | alachlor | mesotrione |
| rimisoxafen | alachlor | sulcotrione |
| rimisoxafen | alachlor | tembotrione |
| rimisoxafen | alachlor | tefuryltrione |
| rimisoxafen | alachlor | bicyclopyrone |
| rimisoxafen | alachlor | fenquinotrione |
| rimisoxafen | alachlor | benzobicyclon |
| rimisoxafen | alachlor | benzofenap |
| rimisoxafen | alachlor | pyrasulfotole |
| rimisoxafen | alachlor | topramezone |
| rimisoxafen | alachlor | pyrazolynate |
| rimisoxafen | alachlor | pyrazoxyfen |
| rimisoxafen | alachlor | tolpyralate |
| rimisoxafen | alachlor | isoxaflutole |
| rimisoxafen | allidochlor | mesotrione |
| rimisoxafen | allidochlor | sulcotrione |
| rimisoxafen | allidochlor | tembotrione |
| rimisoxafen | allidochlor | tefuryltrione |
| rimisoxafen | allidochlor | bicyclopyrone |
| rimisoxafen | allidochlor | fenquinotrione |
| rimisoxafen | allidochlor | benzobicyclon |
| rimisoxafen | allidochlor | benzofenap |
| rimisoxafen | allidochlor | pyrasulfotole |
| rimisoxafen | allidochlor | topramezone |
| rimisoxafen | allidochlor | pyrazolynate |
| rimisoxafen | allidochlor | pyrazoxyfen |
| rimisoxafen | allidochlor | tolpyralate |
| rimisoxafen | allidochlor | isoxaflutole |
| rimisoxafen | butachlor | mesotrione |
| rimisoxafen | butachlor | sulcotrione |
| rimisoxafen | butachlor | tembotrione |
| rimisoxafen | butachlor | tefuryltrione |
| rimisoxafen | butachlor | bicyclopyrone |
| rimisoxafen | butachlor | fenquinotrione |
| rimisoxafen | butachlor | benzobicyclon |
| rimisoxafen | butachlor | benzofenap |
| rimisoxafen | butachlor | pyrasulfotole |
| rimisoxafen | butachlor | topramezone |
| rimisoxafen | butachlor | pyrazolynate |
| rimisoxafen | butachlor | pyrazoxyfen |
| rimisoxafen | butachlor | tolpyralate |
| rimisoxafen | butachlor | isoxaflutole |
| rimisoxafen | butenachlor | mesotrione |
| rimisoxafen | butenachlor | sulcotrione |
| rimisoxafen | butenachlor | tembotrione |
| rimisoxafen | butenachlor | tefuryltrione |
| rimisoxafen | butenachlor | bicyclopyrone |
| rimisoxafen | butenachlor | fenquinotrione |
| rimisoxafen | butenachlor | benzobicyclon |
| rimisoxafen | butenachlor | benzofenap |
| rimisoxafen | butenachlor | pyrasulfotole |
| rimisoxafen | butenachlor | topramezone |
| rimisoxafen | butenachlor | pyrazolynate |
| rimisoxafen | butenachlor | pyrazoxyfen |
| rimisoxafen | butenachlor | tolpyralate |
| rimisoxafen | butenachlor | isoxaflutole |
| rimisoxafen | delachlor | mesotrione |
| rimisoxafen | delachlor | sulcotrione |
| rimisoxafen | delachlor | tembotrione |
| rimisoxafen | delachlor | tefuryltrione |
| rimisoxafen | delachlor | bicyclopyrone |
| rimisoxafen | delachlor | fenquinotrione |
| rimisoxafen | delachlor | benzobicyclon |
| rimisoxafen | delachlor | benzofenap |
| rimisoxafen | delachlor | pyrasulfotole |
| rimisoxafen | delachlor | topramezone |
| rimisoxafen | delachlor | pyrazolynate |
| rimisoxafen | delachlor | pyrazoxyfen |

TABLE C-continued

| Component A | Component B | Component C |
|---|---|---|
| rimisoxafen | delachlor | tolpyralate |
| rimisoxafen | delachlor | isoxaflutole |
| rimisoxafen | diethatyl-ethyl | mesotrione |
| rimisoxafen | diethatyl-ethyl | sulcotrione |
| rimisoxafen | diethatyl-ethyl | tembotrione |
| rimisoxafen | diethatyl-ethyl | tefuryltrione |
| rimisoxafen | diethatyl-ethyl | bicyclopyrone |
| rimisoxafen | diethatyl-ethyl | fenquinotrione |
| rimisoxafen | diethatyl-ethyl | benzobicyclon |
| rimisoxafen | diethatyl-ethyl | benzofenap |
| rimisoxafen | diethatyl-ethyl | pyrasulfotole |
| rimisoxafen | diethatyl-ethyl | topramezone |
| rimisoxafen | diethatyl-ethyl | pyrazolynate |
| rimisoxafen | diethatyl-ethyl | pyrazoxyfen |
| rimisoxafen | diethatyl-ethyl | tolpyralate |
| rimisoxafen | diethatyl-ethyl | isoxaflutole |
| rimisoxafen | dimethachlor | mesotrione |
| rimisoxafen | dimethachlor | sulcotrione |
| rimisoxafen | dimethachlor | tembotrione |
| rimisoxafen | dimethachlor | tefuryltrione |
| rimisoxafen | dimethachlor | bicyclopyrone |
| rimisoxafen | dimethachlor | fenquinotrione |
| rimisoxafen | dimethachlor | benzobicyclon |
| rimisoxafen | dimethachlor | benzofenap |
| rimisoxafen | dimethachlor | pyrasulfotole |
| rimisoxafen | dimethachlor | topramezone |
| rimisoxafen | dimethachlor | pyrazolynate |
| rimisoxafen | dimethachlor | pyrazoxyfen |
| rimisoxafen | dimethachlor | tolpyralate |
| rimisoxafen | dimethachlor | isoxaflutole |
| rimisoxafen | dimethenamid | mesotrione |
| rimisoxafen | dimethenamid | sulcotrione |
| rimisoxafen | dimethenamid | tembotrione |
| rimisoxafen | dimethenamid | tefuryltrione |
| rimisoxafen | dimethenamid | bicyclopyrone |
| rimisoxafen | dimethenamid | fenquinotrione |
| rimisoxafen | dimethenamid | benzobicyclon |
| rimisoxafen | dimethenamid | benzofenap |
| rimisoxafen | dimethenamid | pyrasulfotole |
| rimisoxafen | dimethenamid | topramezone |
| rimisoxafen | dimethenamid | pyrazolynate |
| rimisoxafen | dimethenamid | pyrazoxyfen |
| rimisoxafen | dimethenamid | tolpyralate |
| rimisoxafen | dimethenamid | isoxaflutole |
| rimisoxafen | metazachlor | mesotrione |
| rimisoxafen | metazachlor | sulcotrione |
| rimisoxafen | metazachlor | lembotrione |
| rimisoxafen | metazachlor | tefuryltrione |
| rimisoxafen | metazachlor | bicyclopyrone |
| rimisoxafen | metazachlor | fenquinotrione |
| rimisoxafen | metazachlor | benzobicyclon |
| rimisoxafen | metazachlor | benzofenap |
| rimisoxafen | metazachlor | pyrasulfotole |
| rimisoxafen | metazachlor | topramezone |
| rimisoxafen | metazachlor | pyrazolynate |
| rimisoxafen | metazachlor | pyrazoxyfen |
| rimisoxafen | metazachlor | tolpyralate |
| rimisoxafen | metazachlor | isoxaflutole |
| rimisoxafen | metolachlor (or S-Moc) | mesotrione |
| rimisoxafen | metolachlor (or S-Moc) | sulcotrione |
| rimisoxafen | metolachlor (or S-Moc) | tembotrione |
| rimisoxafen | metolachlor (or S-Moc) | tefuryltrione |
| rimisoxafen | metolachlor (or S-Moc) | bicyclopyrone |
| rimisoxafen | metolachlor (or S-Moc) | fenquinotrione |
| rimisoxafen | metolachlor (or S-Moc) | benzobicyclon |
| rimisoxafen | metolachlor (or S-Moc) | benzofenap |
| rimisoxafen | metolachlor (or S-Moc) | pyrasulfotole |
| rimisoxafen | metolachlor (or S-Moc) | topramezone |
| rimisoxafen | metolachlor (or S-Moc) | pyrazolynate |
| rimisoxafen | metolachlor (or S-Moc) | pyrazoxyfen |
| rimisoxafen | metolachlor (or S-Moc) | tolpyralate |
| rimisoxafen | metolachlor (or S-Moc) | isoxaflutole |
| rimisoxafen | pethoxamid | mesotrione |
| rimisoxafen | pethoxamid | sulcotrione |
| rimisoxafen | pethoxamid | tembotrione |
| rimisoxafen | pethoxamid | tefuryltrione |
| rimisoxafen | pethoxamid | bicyclopyrone |
| rimisoxafen | pethoxamid | fenquinotrione |

TABLE C-continued

| Component A | Component B | Component C |
|---|---|---|
| rimisoxafen | pethoxamid | benzobicyclon |
| rimisoxafen | pethoxamid | benzofenap |
| rimisoxafen | pethoxamid | pyrasulfotole |
| rimisoxafen | pethoxamid | topramezone |
| rimisoxafen | pethoxamid | pyrazolynate |
| rimisoxafen | pethoxamid | pyrazoxyfen |
| rimisoxafen | pethoxamid | tolpyralate |
| rimisoxafen | pethoxamid | isoxaflutole |
| rimisoxafen | pretilachlor | mesotrione |
| rimisoxafen | pretilachlor | sulcotrione |
| rimisoxafen | pretilachlor | tembotrione |
| rimisoxafen | pretilachlor | tefuryltrione |
| rimisoxafen | pretilachlor | bicyclopyrone |
| rimisoxafen | pretilachlor | fenquinotrione |
| rimisoxafen | pretilachlor | benzobicyclon |
| rimisoxafen | pretilachlor | benzofenap |
| rimisoxafen | pretilachlor | pyrasulfotole |
| rimisoxafen | pretilachlor | topramezone |
| rimisoxafen | pretilachlor | pyrazolynate |
| rimisoxafen | pretilachlor | pyrazoxyfen |
| rimisoxafen | pretilachlor | tolpyralate |
| rimisoxafen | pretilachlor | isoxaflutole |
| rimisoxafen | propachlor | mesotrione |
| rimisoxafen | propachlor | sulcotrione |
| rimisoxafen | propachlor | tembotrione |
| rimisoxafen | propachlor | tefuryltrione |
| rimisoxafen | propachlor | bicyclopyrone |
| rimisoxafen | propachlor | fenquinotrione |
| rimisoxafen | propachlor | benzobicyclon |
| rimisoxafen | propachlor | benzofenap |
| rimisoxafen | propachlor | pyrasulfotole |
| rimisoxafen | propachlor | topramezone |
| rimisoxafen | propachlor | pyrazolynate |
| rimisoxafen | propachlor | pyrazoxyfen |
| rimisoxafen | propachlor | tolpyralate |
| rimisoxafen | propachlor | isoxaflutole |
| rimisoxafen | propisochlor | mesotrione |
| rimisoxafen | propisochlor | sulcotrione |
| rimisoxafen | propisochlor | tembotrione |
| rimisoxafen | propisochlor | tefuryltrione |
| rimisoxafen | propisochlor | bicyclopyrone |
| rimisoxafen | propisochlor | fenquinotrione |
| rimisoxafen | propisochlor | benzobicyclon |
| rimisoxafen | propisochlor | benzofenap |
| rimisoxafen | propisochlor | pyrasulfotole |
| rimisoxafen | propisochlor | topramezone |
| rimisoxafen | propisochlor | pyrazolynate |
| rimisoxafen | propisochlor | pyrazoxyfen |
| rimisoxafen | propisochlor | tolpyralate |
| rimisoxafen | propisochlor | isoxaflutole |
| rimisoxafen | prynachlor | mesotrione |
| rimisoxafen | prynachlor | sulcotrione |
| rimi soxafen | prynachlor | tembotrione |
| rimisoxafen | prynachlor | tefuryltrione |
| rimisoxafen | prynachlor | bicyclopyrone |
| rimisoxafen | prynachlor | fenquinotrione |
| rimisoxafen | prynachlor | benzobicyclon |
| rimisoxafen | prynachlor | benzofenap |
| rimisoxafen | prynachlor | pyrasulfotole |
| rimisoxafen | prynachlor | topramezone |
| rimisoxafen | prynachlor | pyrazolynate |
| rimisoxafen | prynachlor | pyrazoxyfen |
| rimisoxafen | prynachlor | tolpyralate |
| rimisoxafen | prynachlor | isoxaflutole |
| rimisoxafen | thenylchlor | mesotrione |
| rimisoxafen | thenylchlor | sulcotrione |
| rimisoxafen | thenylchlor | tembotrione |
| rimisoxafen | thenylchlor | tefuryltrione |
| rimisoxafen | thenylchlor | bicyclopyrone |
| rimisoxafen | thenylchlor | fenquinotrione |
| rimisoxafen | thenylchlor | benzobicyclon |
| rimisoxafen | thenylchlor | benzofenap |
| rimisoxafen | thenylchlor | pyrasulfotole |
| rimisoxafen | thenylchlor | topramezone |
| rimisoxafen | thenylchlor | pyrazolynate |
| rimisoxafen | thenylchlor | pyrazoxyfen |
| rimisoxafen | thenylchlor | tolpyralate |
| rimisoxafen | thenylchlor | isoxaflutole |

TABLE C-continued

| Component A | Component B | Component C |
|---|---|---|
| rimisoxafen | tlufenacet | mesotrione |
| rimisoxafen | tlufenacet | sulcotrione |
| rimisoxafen | llufenacet | lembotrione |
| rimisoxafen | tlufenacet | tefuryltrione |
| rimisoxafen | tlufenacet | bicyclopyrone |
| rimisoxafen | tlufenacet | fenquinotrione |
| rimisoxafen | tlufenacet | benzobicyclon |
| rimisoxafen | tlufenacet | benzofenap |
| rimisoxafen | tlufenacet | pyrasulfotole |
| rimisoxafen | tlufenacet | topramezone |
| rimisoxafen | tlufenacet | pyrazolynate |
| rimisoxafen | tlufenacet | pyrazoxyfen |
| rimisoxafen | tlufenacet | tolpyralate |
| rimisoxafen | tlufenacet | isoxaflutole |
| rimisoxafen | mefenacet | mesotrione |
| rimisoxafen | mefenacet | sulcotrione |
| rimisoxafen | mefenacet | tembotrione |
| rimisoxafen | mefenacet | tefuryltrione |
| rimisoxafen | mefenacet | bicyclopyrone |
| rimisoxafen | mefenacet | fenquinotrione |
| rimisoxafen | mefenacet | benzobicyclon |
| rimisoxafen | mefenacet | benzofenap |
| rimisoxafen | mefenacet | pyrasulfotole |
| rimisoxafen | mefenacet | topramezone |
| rimisoxafen | mefenacet | pyrazolynate |
| rimisoxafen | mefenacet | pyrazoxyfen |
| rimisoxafen | mefenacet | tolpyralate |
| rimisoxafen | mefenacet | isoxaflutole |
| rimisoxafen | anilofos | mesotrione |
| rimisoxafen | anilofos | sulcotrione |
| rimisoxafen | anilofos | tembotrione |
| rimisoxafen | anilofos | tefuryltrione |
| rimisoxafen | anilofos | bicyclopyrone |
| rimisoxafen | anilofos | fenquinotrione |
| rimisoxafen | anilofos | benzobicyclon |
| rimisoxafen | anilofos | benzofenap |
| rimisoxafen | anilofos | pyrasulfotole |
| rimisoxafen | anilofos | topramezone |
| rimisoxafen | anilofos | pyrazolynate |
| rimisoxafen | anilofos | pyrazoxyfen |
| rimisoxafen | anilofos | tolpyralate |
| rimisoxafen | anilofos | isoxaflutole |

Some of the herbicides of component (B) or (C) are commonly used in the form of agronomically acceptable salts. Where a specific herbicide is described as being suitable for use as component (B) or (C), it will appreciated that this includes any suitable agronomically acceptable salt of that herbicide, for example any salt which may form with amines (for example ammonia, dimethylamine and triethylamine), alkali metal and alkaline earth metal bases or quaternary ammonium bases. Among the alkali metal and alkaline earth metal hydroxides, oxides, alkoxides and hydrogen carbonates and carbonates used as salt formers, emphasis is to be given to the hydroxides, alkoxides, oxides and carbonates of lithium, sodium, potassium, magnesium and calcium, but especially those of sodium, magnesium and calcium. The corresponding trimethylsulfonium salt may also be used. The present invention also include the use of hydrates which may be formed during the salt formation for any herbicide of component (B) or (C).

Throughout this document the expression “composition” should be interpreted as meaning the various mixtures or combinations of components (A) and (B), for example in a single “ready-mix” form, in a combined spray mixture composed from separate formulations of the single active ingredient components, such as a “tank-mix”, and in a combined use of the single active ingredients when applied in a sequential manner, i.e. one after the other with a reasonably short period, such as a few hours or days, thereby forming a composition in situ. The order of applying the components (A) and (B) is not essential for working the present invention.

The term "herbicide" as used herein means a compound that controls or modifies the growth of plants. The term "herbicidally effective amount" means the quantity of such a compound or combination of such compounds that is capable of producing a controlling or modifying effect on the growth of plants. Controlling or modifying effects include all deviation from natural development, for example killing, retardation, leaf burn, albinism, dwarfing and the like.

The term "locus" as used herein means fields in or on which plants are growing, or where seeds of cultivated plants are sown, or where seed will be placed into the soil. It includes soil, seeds, and seedlings, as well as established vegetation.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

The term "safener" as used herein means a chemical that when used in combination with a herbicide reduces the undesirable effects of the herbicide on non-target organisms, for example, a safener protects crops from injury by herbicides but does not prevent the herbicide from killing the weeds.

Crops of useful plants in which the composition according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and *Zoysia* grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees: other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides or classes of herbicides (e.g. ALS-, GS-, EPSPS-, PPO-, ACCase- and HPPD-inhibitors (for example HPPD tolerance from trait FG72)) by conventional methods of breeding or by genetic engineering. An example of a crop that has been rendered tolerant to imidazolinones, e.g. imazamox, by conventional methods of breeding is Clearfield® summer rape (canola). Examples of crops that have been rendered tolerant to herbicides by genetic engineering methods include e.g. glyphosate- and glufosinate-resistant maize varieties commercially available under the trade names RoundupReady® and LibertvLink®.

Methods of the invention extend to controlling undesirable vegetation, including weeds having at least one resistance to an existing herbicide, in HPPD tolerant soybean, or crop, and further planting at least one HPPD tolerant soybean. Exemplary HPPD tolerant soybeans include soybeans expressing modified p-hydroxyphenylpyruvate dioxygenase (hppd) enzymes, which may be derived from a variety of sources. In one example, the gene source is *Pseudomonas fluorescens*, e.g. strain A32, and the gene is hppdPF W336, for example, as found in Event FG72. In another example, the HPPD tolerant soybean plant includes a plant having a reduced expression of at least one 4-hydroxyphenylpyruvate reductase (HPPR) enzyme. In other examples, HPPD tolerant soybeans include soybeans modified to overexpress a gene coding for a tolerant HPPD, for example derived from *Avena sativa* (see for example US2011/0173718) or *Arabidopsis* (e.g. as in WO2013/064964, WO2014/177999). In other examples, HPPD tolerant soybeans include soybeans having a modified expression of triketone dioxygenase (TDO) proteins, for example as derived from an *Oryza* species (e.g. *Oryza sativa*, as described by Maeda H. et al (2019). Science, 365(6451), 393-396) found in soybean plants containing event MON 94313.

Crops are also to be understood as being those which have been rendered resistant to harmful insects by genetic engineering methods, for example Bt maize (resistant to European corn borer), Bt cotton (resistant to cotton boll weevil) and also Bt potatoes (resistant to Colorado beetle). Examples of Bt maize are the Bt 176 maize hybrids of NK® (Syngenta Seeds). The Bt toxin is a protein that is formed naturally by *Bacillus thuringiensis* soil bacteria. Examples of toxins, or transgenic plants able to synthesise such toxins, are described in EP-A-451 878, EP-A-374 753, WO 93/07278. WO 95/34656, WO 03/052073 and EP-A-427 529. Examples of transgenic plants comprising one or more genes that code for an insecticidal resistance and express one or more toxins are KnockOut® (maize), Yield Gard® (maize). NuCOTIN33B) (cotton), Bollgard® (cotton), NewLeaf® (potatoes), NatureGard® and Protexcta®. Plant crops or seed material thereof can be both resistant to herbicides and, at the same time, resistant to insect feeding ("stacked" transgenic events). For example, seed can have the ability to express an insecticidal Cry3 protein while at the same time being tolerant to glyphosate.

In aspects of the invention, in any particular embodiment, the weeds, e.g. to be controlled and/or growth-inhibited, may be monocotyledonous or dicotyledonous weeds, which are tolerant or resistant to one or more other herbicides for example, HPPD inhibitor herbicides such as mesotrione, PSII inhibitor herbicides such as atrazine or EPSPS inhibitors such as glyphosate. Such weeds include, but are not limited to resistant *Amaranthus* biotypes.

In specific embodiments, the weeds can have resistance or be tolerant to at least one of Group 5, 14, 15, or 27 herbicides, or any combination thereof. For example, the resistance/tolerance of the weed can be at least two of Group 5, 14, 15, and 27 herbicides, or at least three of Group 5, 14, 15, and 27 herbicides, or all of Group 5, 14, 15, and 27 herbicides. Certain methods of the invention include identifying a resistance or tolerance within a weed or population of weeds. Such embodiments can further include developing a resistance management plan and applying a composition/ pesticides as described herein. In alternative/concurrent embodiments, the resistance/tolerance of the crop can be to at least one of Group 5, 14, 15, or 27 herbicides. For example, the resistance/tolerance of the crop can be at least two of Group 5, 14, 15, and 27 herbicides, or at least three of Group 5, 14, 15, and 27 herbicides, or all of Group 5, 14, 15, and 27 herbicides.

Group 5 herbicides have a mode of action which involves inhibition of photosynthesis at PS II (Serine 264 Binders).

Group 14 herbicides have a mode of action which is designated by inhibition of protoporphyrinogen oxidase (PPO).

Compositions of this invention can also be mixed with one or more further pesticides including herbicides typically different to HPPD-inhibitors and HPPD-inhibitors, for example, fungicides, insecticides, nematocides, bactericides, acaricides, growth regulators, chemosterilants, semiochemicals, repellents, attractants, pheromones, feeding stimulants or other biologically active compounds to form a multi-component pesticide giving an even broader spectrum of agricultural protection.

Similarly compositions of the invention (which includes those comprising one or more additional pesticide as described in the preceding paragraph) can further include one or more safeners. In particular, the following safeners are especially preferred: AD 67 (MON 4660), benoxacor, cloquintocet-mexyl, cyometrinil, cyprosulfamide, dichlormid, dicyclonon, dietholate, fenchlorazole-ethyl, fenclorim, flurazole, fluxofenim, furilazole, furilazome, isoxadifen-ethyl, mefenpyr-diethyl, mephenate, oxabetrinil, naphthalic anhydride (CAS RN 81-84-5), TI-35, N-isopropyl-4-(2-methoxy-benzoylsulfamoyl)-benzamide (CAS RN 221668-34-4) and N-(2-methoxybenzoyl)-4-[(methylaminocarbonyl)amino]benzenesulfonamide. Such safeners may also be used in the form of esters or salts, as mentioned e.g. in The Pesticide Manual, 15th Ed. (BCPC), 2009. Thus, the reference to cloquintocet-mexyl also applies to cloquintocet and to a lithium, sodium, potassium, calcium, magnesium, aluminium, iron, ammonium, quaternary ammonium, sulfonium or phosphonium salt thereof as disclosed in WO02/34048 and the reference to fenchlorazole-ethyl also applies to fenchlorazole, etc.

The compositions of the invention can be applied before or after planting of the crops, before weeds emerge (pre-emergence application) or after weeds emerge (post-emergence application). Where a safener is combined with mixtures of the invention, it is preferred that the mixing ratio of total herbicides to safener (by weight) is from 100:1 to 1:10, especially from 20:1 to 1:1.

It is possible that the safener and the compositions of the invention are applied simultaneously. For example, the safener and the composition of the invention might be applied to the locus pre-emergence or might be applied to the crop post-emergence. It is also possible that the safener and the composition of the invention are applied sequentially. For example, the safener might be applied before sowing the seeds as a seed treatment and the composition of the invention might be applied to the locus pre-emergence or might be applied to the crop post-emergence.

However, it will appreciated that compositions of the invention are particularly useful in non-selective burn-down applications, and as such may also be used to control volunteer or escape crop plants. In such situations, it is clearly not necessary to include a safener in a composition of the invention.

In general, the mixing ratio (by weight) of component (A) herbicide to the compound of component (B) is from 0.01:1 to 100:1 (A:B), more preferably from 0.05:1 to 20:1 (A:B), even more preferably from about 10:1 to about 1:10. Accordingly, preferred ratios—and range composed thereof—include 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, and 10:1.

The mixing ratio (by weight) of component (A) herbicide to the compound of component (C) is from 0.01:1 to 100:1 (A:C), more preferably from 0.05:1 to 20:1 (A:C), even more preferably from about 10:1 to about 1:10. Accordingly, preferred ratios—and range composed thereof—include 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, and 10:1.

The mixing ratio of A:B:C can be 0.01-100:0.01-100:0.01-100, and more preferably from 0.05-20:0.05-20:0.5-20. In some embodiments the ratios of A:B:C can be 0.1-10:0.1-10:0.1-10. In some embodiments the ratios of A:B:C can be 0.2-5:0.2-5:0.2-5.

When applied in a composition of the invention component (A) is typically applied at a rate of 25 to 2000 g ha, more particularly 25, 50, 75, 100, 125, 150, 200, 250, 300, 400, 500, 750, 800, 1000, 1250, 1500, 1800, or 2000 g/ha, and rates between any of such numbers. Such rates of component (A) are applied typically in association with 5 to 2000 g/ha of component (B), and more specifically in association with 5, 10, 15, 20, 25, 50, 75, 100, 120, 125, 140, 150, 200, 240, 250, 300, 400, 480, 500, 750, 1000, 1250, 1500, 1800, or 2000 g/ha of component (B), and rates between any of such numbers. Similarly, component (C), can be applied at rates of 5 to 2000 g/ha, and more specifically in association with 5, 10, 15, 20, 25, 50, 75, 100, 120, 125, 140, 150, 200, 240, 250, 300, 400, 480, 500, 750, 1000, 1250, 1500, 1800, or 2000 g/ha of component (C), and rates between any of such numbers The Examples described herein illustrate but do not limit the range of rates of components (A). (B), and (C) that may be employed in the invention.

In specific aspects of the disclosure, bicyclopyrone can be applied at a rate of about 50 to 100 g/ha; mesotrione can be applied at a rate of about 100 to 210 g/ha; S-Moc can be applied at a rate of about 900 to 1300 g/ha; isoxaflutole can be applied at about 100 to 200 g/ha; and/or pyroxysulfone can be applied at a rate of about 90 to 240 g/ha, preferably about 90 to 100 g/ha. Rimisoxafen can be applied at a rate of at least about 15 g/ha, at least about 30 g/ha, or at least about 60 g/ha, for example rimisoxafen can be applied at a rate of about 15 to 200 g/ha; about 30 to 200 g/ha; about 60 to 200 g/ha: or about 30 to 100 g/ha.

The amount of a composition according to the invention to be applied, will depend on various factors, such as the compounds employed; the subject of the treatment, such as, for example plants, soil or seeds; the type of treatment, such as, for example spraying, dusting or seed dressing; or the application time. In agricultural practice the application rates of the composition according to the invention depend on the type of effect desired, and typically range from 30 to 4000 g of total composition per hectare, and more commonly between 30 and 2000 g/ha. The application is generally made by spraying the composition, typically by tractor mounted sprayer for large areas, but other methods such as dusting (for powders), drip or drench can also be used.

The compositions of the invention can advantageously be used in the below-mentioned formulations (in which case "active ingredient" relates to the respective mixture of component (A), (B), and (C) or, when a safener is also used, the respective mixture of component (A), (B), and (C) and the safener).

The individual components of the composition of the invention may be utilised as the technical active ingredient as produced. More typically however, the compositions according to the invention may be formulated in various ways using formulation adjuvants, such as carriers, solvents and surface-active substances. The formulations can be in various physical forms. e.g. in the form of dusting powders, gels, wettable powders, water-dispersible granules, water-dispersible tablets, effervescent pellets, emulsifiable concentrates, miicroemulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate: sorbitol esters, such as sorbitol oleate: quaternary amines, such as lauryltrimethylammonium chloride, polyethylene glycol esters of fatty acids, such as polyethylene glycol stearate; block copolymers of ethylene oxide and propylene oxide; and salts of mono and di-alkylphosphate esters: and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The formulations according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The formulations generally comprise from 0.1 to 99% by weight, especially from 0.1 to 95% by weight, of compounds (A) and (B) and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %), wherein the term "active ingredient" refers to the total weight % of the combination of all active ingredients in the composition:

| | |
|---|---|
| Emulsifiable concentrates: | |
| active ingredient: | 1 to 95%, preferably 60 to 90% |
| surface-active agent: | 1 to 30%, preferably 5 to 20% |
| liquid carrier: | 1 to 80%, preferably 1 to 35% |
| Dusts: | |
| active ingredient: | 0.1 to 10%, preferably 0.1 to 5% |
| solid carrier: | 99.9 to 90%, preferably 99.9 to 99 |
| Suspension concentrates: | |
| active ingredient: | 5 to 75%, preferably 10 to 50% |
| water: | 94 to 24%, preferably 88 to 30% |
| surface-active agent: | 1 to 40%, preferably 2 to 30% |
| Wettable powders: | |
| active ingredient: | 0.5 to 90%, preferably 1 to 80% |
| surface-active agent: | 0.5 to 20%, preferably 1 to 15% |
| solid carrier: | 5 to 95%, preferably 15 to 90% |
| Granules: | |
| active ingredient: | 0.1 to 30%, preferably 0.1 to 15% |
| solid carrier: | 99.5 to 70%, preferably 97 to 85% |

Various aspects and embodiments of the present invention will now be illustrated in more detail by way of example. It will be appreciated that modification of detail may be made without departing from the scope of the invention.

For example, specific embodiments include:

Embodiment 1: A composition, comprising: (A) rimisoxafen; (B) a group 15 herbicide; and (C) an HPPD inhibitor herbicide, or agrochemically acceptable salts thereof.

Embodiment 2: The composition of Embodiment 1, wherein (A), (B), and (C) are present in a synergistic weight ratio as defined by the Colby Formula.

Embodiment 3. The composition of either Embodiments 1 or 2, wherein (A), (B), and (C) are in a weight ratio of 0.1-10:0.1-10:0.1-10.

Embodiment 4. The composition of any one of Embodiments 1-3, wherein the HPPD inhibitor herbicide is mesotrione.

Embodiment 5. The composition of any one of Embodiments 1-3, wherein the HPPD inhibitor herbicide is bicyclopyrone.

Embodiment 6. The composition of any one of Embodiments 1-5, wherein the group 15 herbicide is s-metalochlor (S-Moc).

Embodiment 7. The composition of any one of Embodiments 1-5, wherein the group 15 herbicide is pyroxasulfone.

Embodiment 8. The composition of any one of claims 1-7, further comprising an agriculturally acceptable formulation adjuvant.

Embodiment 9. The composition of any one of Embodiments 1-8, further comprising at least one additional pesticide.

Embodiment 10. The composition of any one of Embodiments 1-9, wherein the composition consists essentially of (A) rimisoxafen; (B) the group 15 herbicide; and (C) the HPPD inhibitor herbicide, or agrochemically acceptable salts thereof.

Embodiment 11. The composition of any one of Embodiments 1-10, wherein an herbicidal component of the composition consists of: (A) rimisoxafen; (B) group 15 herbicide; and (C) HPPD inhibitor herbicide, or agrochemically acceptable salts thereof.

Embodiment 12. A method of controlling unwanted plant growth, comprising: applying the composition of any one of Embodiments 1-11 to the unwanted plants or to the locus thereof.

Embodiment 13. A method comprising: applying a herbicidally effective amount of (A) rimisoxafen; (B) group 15 herbicide; and (C) HPPD inhibitor herbicide, or agrochemically acceptable salts thereof to the unwanted plants or to the locus thereof sequentially.

Embodiment 14. A method of crop production, comprising: planting at least one seed of a crop plant in a field: treating the field with a combination of rimisoxafen, a group 15 herbicide, and a HPPD inhibitor herbicide, or a composition according to any one of Embodiments 1-10, to control the presence of undesired vegetation; cultivating the at least one seed to produce a crop; and harvesting the crop.

Embodiment 15. The method of Embodiment 14, wherein the crop is soybean.

Embodiment 16. The method of Embodiment 14 or 15, wherein the seed is tolerant to an HPPD herbicide.

Embodiment 17. The method of any one of Embodiments 14-16, wherein the combination is applied as a composition.

Embodiment 18. The method of any one of Embodiments 14-16, further comprising analyzing the field for herbicide tolerant or resistant undesired vegetation.

Embodiment 19. The method of Embodiment 18, wherein analyzing comprises at least one of reviewing historical records or genetic testing.

Embodiment 20. The method of any one of Embodiments 14-19, wherein the undesired vegetation is resistant or tolerant to at least one herbicide.

Embodiment 21. A composition comprising an herbicidal component, wherein the herbicidal component consists of:

(1) rimisoxafen, s-metalochlor, and mesotrione;

(2) rimisoxafen, s-metalochlor, and bicyclopyrone;

(3) rimisoxafen, s-metalochlor, mesotrione, and bicyclopyrone; or (4) rimisoxafen, pyroxasulfone, mesotrione, and bicyclopyrone.

BIOLOGICAL EXAMPLES

A first trial was established in a glasshouse where 8 unique populations of *Amaranthus* were seeded prior to herbicide application. Of these eight populations, three *Amaranthus* populations (one *A. palmeri* (AMAPA) and two *A. tuberculatus* (AMATA)) have observed sensitivity to various group 12 and group 27 herbicides along with five additional *Amaranthus* populations (four *A. palmeri* and one *A. tuberculatus*) that have observed resistance to multiple herbicides including groups 5, 14, 15, and 27 herbicides. Herbicide applications were made with a track sprayer and applied to the soil surface using an application volume of 200 L/ha. Subsequent management used standard watering to ensure viable plant growth and development. The results are summarized in the tables FIG. 1A and FIG. 18 which provide control at 13 days after application (DAA). Table 1 below defines each population assessed against.

TABLE 1

| Designation | Description | Observed Resistance(s) |
|---|---|---|
| Pop. 1 | *A. tuberculatus* | n/a |
| Pop. 2 | *A. palmeri* | n/a |
| Pop. 3 | *A. tuberculatus* | yes |
| Pop. 4 | *A. tuberculatus* | yes |
| Pop. 5 | *A. palmeri* | n/a |
| Pop. 6 | *A. palmeri* | yes |
| Pop. 7 | *A. palmeri* | yes |
| Pop. 8 | *A. palmeri* | yes |
| Pop. 9 | *A. palmeri* | yes |

A second trial was carried out in a glasshouse using the same methodology as the first trial. The second trial included *Echinochloa grus-gali* (ECHCG), *Setaria faberi* (SETFA), *Eleusine indica* (ELEIN), and *Amaranthus tuberculatus* var. *rudis* (AMATA), in addition to various *Amaranthus palmeri* (AMAPA) species. Control results at 13 DAA are provided in the tables of FIGS. 2A-2D; control results at 21 DAA are provided in the tables of FIGS. 3A-3D. Table 2 below defines each population assessed against.

TABLE 2

| Designation | Description | Observed Resistance(s) |
|---|---|---|
| Pop. A | *Echinochloa grus-gali* | n/a |
| Pop. B | *Setaria faberi* | n/a |
| Pop. C | *Eleusine indica* | n/a |
| Pop. D | *A. palmeri* | n/a |
| Pop. E | *A. palmeri* | yes |
| Pop. F | *A. palmeri* | yes |
| Pop. G | *A. palmeri* | yes |
| Pop. H | *A. tuberculatus* | yes |

The second trial included a study of the safety of the herbicidal combinations on soybeans. The trial was carried out with two different soybean cultivars; and Soy A (GM Soya modified for HPPD tolerance) and Soy B(Soya cv. Jack (wild type)). The results are summarized in Tables 3 and 4 below showing crop injury at 13 DAA and 21 DAA, respectively.

TABLE 3

| Crop Damage 13 DAA | | | | |
|---|---|---|---|---|
| | | | Injury (13DAA) | |
| Trt No. | Treatment | Rate g ai/ha | Soy A | Soy B |
| 60 | Rimisoxafen + S-Moc + Mesotrione | 16 + 15 + 25.3 | 0 | 30 |

TABLE 4

| Crop Damage 21 DAA | | | | |
|---|---|---|---|---|
| | | | Injury (21DAA) | |
| Trt No. | Treatment | Rate g ai/ha | Soy A | Soy B |
| 60 | Rimisoxafen + S-Moc + Mesotrione | 16 + 15 + 25.3 | 0 | 45 |

A third trial was carried out to study the safety of the herbicidal combinations on soybeans using the same methodology as the first trial. The trial was carried out with three different soy bean cultivars: Soy 1 (Soya cv. Jack (wild type)); Soy 2 (Soya cv. S20-G7); Soy 3 (GM Soya modified for HPPD tolerance). The results are summarized in Table 5 below showing crop injury at 20 DAA.

TABLE 5

| Crop Damage 20 DAA | | | | | |
|---|---|---|---|---|---|
| Trt No. | Treatment | Rate g ai/ha | Soy 1 | Soy 2 | Soy 3 |
| 1 | Rimisoxafen + Mesotrione + S-Moc | 30 + 102 + 1000 | 80 | 78 | 3 |
| 2 | | 60 + 102 + 1000 | 76 | 67 | 7 |
| 3 | | 15 + 205 + 1000 | 57 | 55 | 10 |
| 4 | | 30 + 205 + 1000 | 48 | 63 | 7 |

The invention claimed is:

1. A method of controlling a population of plants, said population of plants including a crop plant and a weed, in a field, comprising:

planting at least one seed of the crop plant, said at least one seed of the crop plant being soybean and having HPPD tolerance, in the field;

applying an herbicidally effective amount of an herbicidal composition having an herbicidal combination comprising:

(A) rimisoxafen, (B) mesotrione, and (C) bicyclopyrone;

(A) rimisoxafen, (B) S-metolachlor, and (C) mesotrione;

(A) rimisoxafen, (B) S-metolachlor, (C) mesotrione, and (D) bicyclopyrone; or (A) rimisoxafen, (B) pyroxasulfone, (C) mesotrione, and (D) bicyclopyrone, to the population of plants or the locus thereof in the field; and cultivating the at least one seed to produce a crop;

wherein the applying is pre-emergent;

wherein the weed in the population of plants includes *A. palmeri* and/or *A. tuberculatus*; and wherein the method comprises selectively controlling the population of plants such that:

(i) crop injury to the soybean is less than 10% 20 days after the applying, (ii) control of the weed in the population of plants is at least about 25% 13 days after the applying, and (iii) control of the weed in the population of plants is at least about 75% 21 days after the applying.

2. The method of claim 1, wherein the weed has observed resistance(s).

3. The method of claim 2, wherein the observed resistance(s) comprises at least one of resistance to inhibitors of very long chain fatty acid (VLCFA), inhibitors of 4-hydroxyphenylpyruvatedioxygenase (4-HPPD), inhibitors of photosynthesis at PS II, and inhibitors of protoporphyrinogen oxidase (PPO).

4. The method of claim 1, wherein the population of plants includes *A. palmeri.*

5. The method of claim 4, wherein the *A. palmeri* has observed resistance(s).

6. The method of claim 1, wherein the population of plants includes *A. tuberculatus.*

7. The method of claim 6, wherein the *A. tuberculatus* has observed resistance(s).

8. The method of claim 1, wherein the herbicidal combination has a synergistic weight ratio of components as defined by the Colby Formula.

9. The method of claim 1, wherein the herbicidal combination includes:

(A) rimisoxafen, (B) mesotrione, and (C) bicyclopyrone.

10. The method of claim 1, wherein the herbicidal combination includes (A) rimisoxafen, (B) S-metolachlor, and (C) mesotrione.

11. The method of claim 1, wherein the herbicidal combination includes (A) rimisoxafen, (B) S-metolachlor, (C) mesotrione, and (D) bicyclopyrone.

12. The method of claim 1, wherein the herbicidal combination includes (A) rimisoxafen, (B) pyroxasulfone, (C) mesotrione, and (D) bicyclopyrone.

13. The method of claim 1, further comprising analyzing a field of the population of plants for herbicide tolerant or resistant weeds.

14. The method of claim 13, wherein the analyzing comprises at least one of reviewing historical records or genetic testing.

15. The method of claim 1, further comprising diluting an agrochemical composition comprising the herbicidal combination.

16. The method of claim 1, wherein control of the weed in the population of plants is at least about 90% 13 days after the applying, and control the weed in of the population of plants is at least about 90% 21 days after the applying.

17. The method of claim 1, wherein the rimisoxafen is applied at a rate of about 15 to 200 g/ha.

18. The method of claim 1, wherein the rimisoxafen is applied at a rate of about 30 to 100 g/ha.

19. The method of claim 18, wherein, when present:

(a) the bicyclopyrone is applied at a rate of 50 to 100 g/ha;

(b) the mesotrione is applied at a rate of 100 to 210 g/ha;

(c) the S-metolachlor is applied at a rate of 900 to 1300 g/ha; and (d) the pyroxasulfone is applied at a rate of 90 to 240 g/ha.

20. The method of claim 19, wherein the herbicidal combination includes: (A) rimisoxafen, (B) mesotrione, and (C) bicyclopyrone.

21. The method of claim 19, wherein the herbicidal combination includes (A) rimisoxafen, (B) S-metolachlor, and (C) mesotrione.

22. The method of claim 19, wherein the herbicidal combination includes (A) rimisoxafen, (B) S-metolachlor, (C) mesotrione, and (D) bicyclopyrone.

23. The method of claim 19, wherein the herbicidal combination includes (A) rimisoxafen, (B) pyroxasulfone, (C) mesotrione, and (D) bicyclopyrone.

24. The method of claim 19, wherein the herbicidal combination consists of: (A) rimisoxafen, (B) mesotrione, and (C) bicyclopyrone.

25. The method of claim 19, wherein the herbicidal combination consists of (A) rimisoxafen, (B) S-metolachlor, and (C) mesotrione.

26. The method of claim 19, wherein the herbicidal combination consists of (A) rimisoxafen, (B) S-metolachlor, (C) mesotrione, and (D) bicyclopyrone.

27. The method of claim 19, wherein the herbicidal combination consists of (A) rimisoxafen, (B) pyroxasulfone, (C) mesotrione, and (D) bicyclopyrone.

* * * * *